United States Patent Office
3,070,477
Patented Dec. 25, 1962

3,070,477

METHOD OF MAKING A GALLIUM SULFIDE DIOXIDE

Joseph Mandelkorn, Lakewood, N.J., assignor to the United States of America as represented by the Secretary of the Army No Drawing. Filed Oct. 3, 1960, Ser. No. 60,231
5 Claims. (Cl. 156—17)
(Granted under Title 35, U.S. Code (1952), sec. 266)

The invention described herein may be manufactured and used by or for the Government for governmental purposes, without the payment of any royalty thereon.

This invention relates to a method for removing the resistance skin from the surface of compound semiconductors in general and, in particular, to a method for removing the resistance skin from the surface of gallium phosphide.

An object of the invention is to make point contact devices on a gallium phosphide surface. Another object is to make low resistance contacts to devices made from gallium phosphide or to make low resistance contacts in order to measure the properties of gallium phosphide. A further object is to obtain good surfaces for alloying or diffusion of dopants into the gallium phosphide.

Briefly, the method comprises placing on the surface of the gallium phosphide a solution in an etchant of a metal salt whose metal ions are lower in the electromotive series than gallium.

Gallium phosphide, when grown or cut, typically has a high resistance oxide skin on its exposed surface which makes it impossible to obtain low resistance contacts to the material. It is therefore impossible to make point contact devices from the untreated material. Even if the material is etched, it seems to re-form its oxide skin instantaneously upon leaving the etching bath.

It has now been found that certain chemical treatments result in permanent removal of the oxide skin from gallium phosphide so that point contact devices can then be made, or low resistance contacts to the gallium phosphide can be made, or good low contact resistance alloyed junctions can be made in the gallium phosphide.

According to the method, a solution in an etchant of a metal salt whose metal ions are lower in the electromotive series than gallium is placed on the surface of the gallium phosphide. If a junction is desired in the gallium phosphide, then appropriate dopant ions are added to the treating solution. The etchant in the solution attacks the skin of the gallium phosphide and dissolves it. The gallium atoms then go into solution displacing the less active metal ions of the metal salt which were in solution. These less active ions then precipitate as atoms on the surface of the material. If a point contact is desired, then the precipitated precious metal is removed leaving a layer of exposed phosphorous atoms which is stable, i.e., resistant to oxidation or reforming of skin. The placing of a tungsten point on this prepared surface gives rise to a fine area point contact diode which has good characteristics. Where the objective is to form low resistance contacts, the choice of a suitable metal salt or of appropriate metals to be evaporated, plated or alloyed onto the surface will yield such contacts. If desired, surface barrier junctions may be obtained on this surface by choosing metals for the surface which yield surface barrier junctions rather than ohmic contacts.

The particular metal salt used is not critical. That is, the only requirement is that the metal ions of the salt be lower in the electromotive series than the metal atoms of the compound semiconductor. Salts of the precious metals work well as, for example, silver nitrate or gold chloride. The use of gold chloride has been found especially desirable when the compound semiconductor treated is gallium phosphide.

Similarly, the concentration of the metal salt in the solution is not critical. This is because the concentration of metal salt in solution changes as the solution evaporates. It is only important that sufficient metal salt be in solution to form a continuous protective film to prevent oxidation of the surface of the compound semiconductor. A saturated solution of gold chloride in aqua regia has been found to work well when treating gallium phosphide.

The thickness of the metallic film precipitated onto the compound semiconductor is not critical. In the instance where a point contact device is desired, the film is generally of such a thickness that facilitates removal by gentle scratching or solvent action to uncover the stable surface of the compound semiconductor. In the case of gallium phosphide, it has been found that the treated surface will be stable against oxidation for long periods of time after the precipitated film of metal salt has been removed.

In carrying out the method, no heat is required. That is, the drop of solution can be applied to the surface of the compound semiconductor and allowed to stand overnight for evaporation of the volatiles of the solution. If it is desired to carry out the process more rapidly, gentle heat can be applied. This heat can be supplied in the case of gallium phosphide by placing the gallium phosphide on a heated substrate which does not react with gallium phosphide as, for example, a heated sheet of platinum. Intense heat that would cause sputtering of the solution should be avoided however, as this causes a discontinuous film of metal to be precipitated onto the compound semiconductor.

The function of the etchant is to hold the metal salt in solution and to attack and remove the oxide resistance skin of the compound semiconductor. This enables the metal salt in the solution to react with the compound semiconductor and displace the metal of the compound semiconductor. Aqua regia has been found especially desirable as an etchant for gallium phosphide. The mere acidification of the metal salt solution with an inorganic acid as, for example, HCl will not cause the chemical displacement in the case of gallium phosphide.

The following examples illustrate the principles of the invention.

*Example 1*

A drop of a saturated solution of gold chloride in aqua regia is placed carefully on the top surface of a gallium phosphide crystal which is heated on a substrate which does not react with gallium phosphide. The temperature of the gallium phosphide surface is kept between 50° C. and 150° C. After the solution has evaporated off, the film of precipitated gold is removed with potassium cyanide solvent leaving a layer of exposed phosphorous atoms which is stable and does not form a high resistance oxide skin. When a large area contact is made to the bottom surface of the gallium phosphide crystal as, for example, by the application of indium gallium, and a fine tungsten point is placed on the top prepared surface, a small area point contact diode is formed. This diode performs well at high frequencies and high temperatures as, for example, at 10,000 megacycles and at 500° C.

*Example 2*

A 10 mil diameter zinc wire 3 inches in length is dissolved in 100 ml. of a saturated solution of gold chloride in aqua regia. A drop of the resulting solution is placed on the surface of a piece of N-type gallium phosphide. The piece of gallium phosphide is then gently heated. When an indium gallium contact is made to the bottom surface and a tungsten point brought to bear on the top treated surface, good diode characteristics are obtained. Under the conditions where the diode is biased in the reverse direction in its breakdown region, the entire surface glows green showing the presence of a zinc doped surface. The voltage polarity for putting the diode into its low resistance direction (forward voltage polarity) is positive on the top treated surface indicating the presence of a zinc ("P" type) top surface. Further heating of the material results in a current voltage characteristic similar to that of an Esaki diode.

If dopant is added to the treating solution as in Example 2, the amount added is dependent upon the particular structure desired to be formed in the compound semiconductor. A larger amount of dopant is used when an Esaki diode junction is desired whereas a smaller amount of dopant is used where an ordinary diode junction is desired.

It is to be understood that the method of this invention is applicable to the treatment of compound semiconductors in general which have the undesirable surface characteristic of a resistive oxide skin.

While there has been described what is at present a preferred embodiment of the invention, it will be obvious to those skilled in the art that various changes and modifications may be made without departing from the invention, and it is therefore aimed in the appended claims to cover all such changes and modifications as fall within the true spirit and scope of the invention.

What is claimed is:

1. The method of removing the high resistance oxide skin and gallium atoms from the surface of gallium phosphide comprising applying to the surface of the gallium phosphide a solution in aqua regia of a metal salt whose metal ions are lower in the electromotive series than gallium.

2. The method according to claim 1 wherein the metal salt is gold chloride.

3. The method according to claim 1 wherein dopant atoms are added to the solution.

4. The method of preparing the surface of gallium phosphide so as to dissolve out the gallium atoms and the oxide skin and leave exposed a stable surface layer of phosphorous atoms comprising placing on the surface of the gallium phosphide a solution in aqua regia of gold chloride and then removing the film of precipitated gold.

5. The method of forming a fine area point contact diode capable of performing well at high frequencies and high temperatures consisting of placing a drop of a solution of gold chloride in aqua regia on the top surface of a crystal of gallium phosphide to remove the gallium atoms and resistance skin, removing the film of precipitated gold so formed, making a large area contact to the bottom surface of the gallium phosphide crystal, and then placing a fine tungsten point on the top prepared surface.

References Cited in the file of this patent

UNITED STATES PATENTS

| | | |
|---|---|---|
| 2,846,340 | Jenny | Aug. 5, 1958 |
| 2,900,286 | Goldstein | Aug. 18, 1959 |

UNITED STATES PATENT OFFICE

CERTIFICATE OF CORRECTION

Patent No. 3,070,477 December 25, 1962

Joseph Mandelkorn

It is hereby certified that error appears in the above numbered patent requiring correction and that the said Letters Patent should read as corrected below.

In the heading to the printed specification, lines 2 and 3, title of invention, for "METHOD OF MAKING A GALLIUM SULFIDE DIOXIDE" read -- METHOD OF TREATING THE SURFACE OF GALLIUM PHOSPHIDE --.

Signed and sealed this 1st day of October 1963.

(SEAL)
Attest:

ERNEST W. SWIDER
Attesting Officer

DAVID L. LADD
Commissioner of Patents